United States Patent
Mudigowdra et al.

(10) Patent No.: US 8,856,449 B2
(45) Date of Patent: Oct. 7, 2014

(54) METHOD AND APPARATUS FOR DATA STORAGE AND ACCESS

(75) Inventors: Channabasappa Mudigowdra, Bangalore (IN); Harsha Sathyanarayana Naga, London (GB); Kavila Khatawate, Bangalore (IN); Sukanta Banik, Delhi (IN); Venkata Subba Raju Ganapathi Raju, London (GB); Pramod (Das Pramod) Pramod Das, London (GB); Ashok Kumar, Pithoragarth (IN)

(73) Assignee: Nokia Corporation, Espoo (FI)

( * ) Notice: Subject to any disclaimer, the term of this patent is extended or adjusted under 35 U.S.C. 154(b) by 428 days.

(21) Appl. No.: 13/131,832

(22) PCT Filed: Nov. 27, 2009

(86) PCT No.: PCT/IB2009/007584
§ 371 (c)(1),
(2), (4) Date: Oct. 11, 2011

(87) PCT Pub. No.: WO2010/061285
PCT Pub. Date: Jun. 3, 2010

(65) Prior Publication Data
US 2012/0185666 A1 Jul. 19, 2012

(30) Foreign Application Priority Data
Nov. 27, 2008 (GB) .................................. 0821737.4

(51) Int. Cl.
*G06F 12/08* (2006.01)
*G06F 17/30* (2006.01)

(52) U.S. Cl.
CPC .................................. *G06F 17/3048* (2013.01)
USPC .......................................................... 711/129

(58) Field of Classification Search
CPC .................................................. G06F 17/3048
See application file for complete search history.

(56) References Cited

U.S. PATENT DOCUMENTS 5,924,096 A 7/1999 Draper
6,009,271 A 12/1999 Whatley
(Continued)

FOREIGN PATENT DOCUMENTS

| EP | 1321865 A2 | 6/2003 |
| GB | 2264577 A | 9/1993 |
| WO | 0146865 A1 | 6/2001 |

OTHER PUBLICATIONS

Search Report received for corresponding United Kingdom Patent Application No. 0821737.4, dated Mar. 10, 2009, 3 pages.
(Continued)

*Primary Examiner* — Hiep Nguyen
(74) *Attorney, Agent, or Firm* — Alston & Bird LLP

(57) ABSTRACT

A query cache stores queries and corresponding results of the queries, the results of the queries being derived from a primary store. A differential store stores a pointer to data of the primary store which has changed and which affects the result of the queries stored in the query store. A new query may be satisfied by accessing the corresponding query in the query store and determining, by reference to the differential store, whether data relating to the query in the primary store has changed since the query store was compiled and, completing the new query, by accessing the corresponding data in the primary store, if applicable. Data in the differential store may be arranged and partitioned according to labels. The partitioning may be varied according to predetermined rules.

21 Claims, 5 Drawing Sheets

(56) References Cited

U.S. PATENT DOCUMENTS

| | | | |
|---|---|---|---|
| 6,073,141 | A | 6/2000 | Salazar |
| 6,591,266 | B1 | 7/2003 | Li |
| 7,089,228 | B2 * | 8/2006 | Arnold et al. ............... 707/690 |
| 8,019,735 | B2 * | 9/2011 | White ........................ 707/690 |
| 2002/0120791 | A1 | 8/2002 | Somalwar et al. |
| 2004/0133538 | A1 | 7/2004 | Amiri et al. |
| 2004/0236726 | A1 | 11/2004 | Ewing et al. |
| 2006/0224578 | A1 | 10/2006 | Kadatch et al. |
| 2006/0224579 | A1 | 10/2006 | Zheng |
| 2011/0173177 | A1 * | 7/2011 | Junqueira et al. .......... 707/709 |

OTHER PUBLICATIONS

Mehta et al., "Dynamic Memory Allocation for Multiple-Query Workloads", Proceedings of the 19th VLDB Conference, 1993, pp. 1-28.

International Search Report and Written Opinion received for corresponding Patent Cooperation Treaty Application No. PCT/IB2009/007584, dated Jun. 2, 2010, 14 pages.

International Preliminary Report on Patentability received for corresponding Patent Cooperation Treaty Application No. PCT/IB2009/007584, dated Jun. 2, 2010, 10 pages.

European Search Report received for corresponding Patent Application No. 09828709.7, dated Apr. 3, 2012, 6 pages.

Office Action received for corresponding Chinese Application No. 200980147734.X, dated May 15, 2013, 13 pages.

Office Action for Chinese Application No. 200980147734.X; dated Dec. 10, 2013.

* cited by examiner

| | 202 | 204 | 206 | |
|---|---|---|---|---|
| | Query | Query Result | Service Type | 200 |
| 208 | Query 1 | Result 1  218 | Service A | 228 |
| 210 | Query 2 | Result 2  220 | Service B | 230 |
| 212 | Query 3 | Result 3  222 | Service A | 232 |
| 214 | Query 4 | Result 4  224 | Service B | 234 |
| 216 | Query 5 | Result 5  226 | Service C | 236 |

| | 252 | 254 | |
|---|---|---|---|
| | Data | Service Type | 250 |
| 256 | Pointer 1 | Service A | 268 |
| 258 | Pointer 2 | Service B | 270 |
| 260 | Pointer 3 | Service C | 272 |
| 262 | Pointer 4 | Service B | 274 |
| 266 | Pointer 5 | Service B | 278 |

METHOD AND APPARATUS FOR DATA
STORAGE AND ACCESS

RELATED APPLICATION

This application was originally filed as PCT Application No. PCT/IB2009/007584, filed Nov. 27,2009, which claims priority benefit from Great Britain Patent Application No. 0821737.4, Filed Nov. 27,2008.

TECHNICAL FIELD

Example embodiments of this invention relate to the field of data storage and access. Certain embodiments of this invention relate to the field of data caches and, in particular, caches for storing calculated results.

SUMMARY OF EXAMPLE EMBODIMENTS OF THE INVENTION

Example embodiments of the invention relate to a method comprising:
storing, in a query store, a query and a result relating to said query derived from a primary store; and
storing an indication that data of said primary store has changed in a differential store.

The method may further comprise storing data relating to said stored query and to said stored result in said differential store.

Storing an indication that data of said primary store has changed in said differential store may comprise storing a pointer to said primary store in said differential store.

The method may further comprise servicing said received query by retrieving data from said query store and from said differential store.

Said differential store may be configured to store changes to a contents of said primary store.

The differential store may be adapted to store data together with a label corresponding to said data.

The label may identify a data type and said method may further comprise storing more than one data type in said differential store and, in this instance, the differential store may be partitioned, each partition accommodating data having a different value for said label.

One or more of the partitions may have a predetermined size.

A size of one or more of said partitions may be dynamically variable.

The number of partitions may be dynamically variable.

The primary store may be stored on a first storage type and said query store and said differential store may be stored on a second storage type, said second storage type having a faster access time than said first storage type.

The method may further comprise updating a contents of the query store with reference to data stored in the differential store.

The updating may be performed when a size of the differential store exceeds a predetermined size.

The updating may be performed after a predetermined time.

The predetermined time may be determined with reference to a time period in which said differential store is idle.

Further example embodiments of the invention extend to an apparatus comprising:
a processor,
memory arranged into a primary store, a query store and a differential store;
said memory including computer program code,
the memory and the computer program code configured to, with the processor, cause the apparatus at least to perform:
storing, in the query store, a query and a result relating to said query derived from the primary store; and
storing an indication that data of said primary store has changed in the differential store.

The apparatus may further perform: storing data relating to said stored query and to said stored result in said differential store.

Storing an indication that data of said primary store has changed in said differential store may comprise storing a pointer to said primary store in said differential store.

The apparatus may further perform: servicing said received query by retrieving data from said query store and from said differential store.

Said differential store may be configured to store changes to a contents of said primary store.

The differential store may be adapted to store data together with a label corresponding to said data.

The label may identify a data type and said apparatus may further perform: storing more than one data type in said differential store and, in this instance, the differential store may be partitioned, each partition accommodating data having a different value for said label.

One or more of the partitions may have a predetermined size.

A size of one or more of said partitions may be dynamically variable.

The number of partitions may be dynamically variable.

The primary store may be stored on a first storage type and said query store and said differential store may be stored on a second storage type, said second storage type having a faster access time than said first storage type.

The apparatus may further perform: updating a contents of the query store with reference to data stored in the differential store.

The updating may be performed when a size of the differential store exceeds a predetermined size.

The updating may be performed after a predetermined time.

The predetermined time may be determined with reference to a time period during which said differential store is idle.

Further example embodiments of the invention extend to a computer program product comprising a computer readable medium bearing computer program code embodied therein for use with a computer, the computer program code comprising:
code for storing, in a query store, a query and a result relating to said query derived from a primary store; and
code for storing an indication that data of said primary store has changed in the differential store.

The computer program product may further comprise code for performing the aforementioned method.

Further example embodiments of the invention extend to a computer program, comprising:
code for storing, in a query store, a query and a result relating to said query derived from a primary store; and
code for storing an indication that data of said primary store has changed in the differential store.

The computer program may further comprise code for performing the aforementioned method.

The computer program may be a computer program product comprising a computer-readable medium bearing computer program code embodied thereon for use with a computer.

Further example embodiments of the invention extend to a method comprising:

storing, in a query store, a query and a result relating to said query, said result being calculated on the basis of data stored in a primary store;

on detecting a change in data stored in said primary store affecting one or more results stored in said primary store, storing an indication in a differential store that said one or more results have been affected, without recalculating said one or more affected results.

Each indication in said differential store may relate to a corresponding result in said differential store.

Further example embodiments of the invention extend to maintaining a differential store as herein described.

The updating may be performed after a predetermined time. The predetermined time may be a time period in which the differential store is idle.

BRIEF DESCRIPTION OF THE DRAWINGS

Example embodiments of the invention are hereinafter described with reference to the accompanying diagrams where.

DESCRIPTION OF PREFERRED EMBODIMENTS

Figure 1:
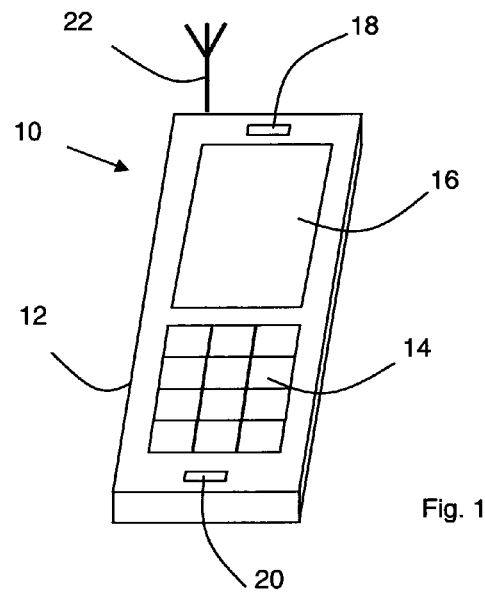
FIG. 1 is a schematic diagram of a mobile computing device in which an embodiment of the invention has been implemented.

FIG. 1 is a schematic diagram of a mobile computing device 10 having a casing 12. The casing 12 encapsulates a keypad 14, a screen 16, a speaker 18 and a microphone 20. The device 10 further includes an antenna 22. The mobile computing device 10 illustrated in FIG. 1 may function as a phone and, in this instance, sends and receives telecommunication signals via antenna 22.

Figure 2:
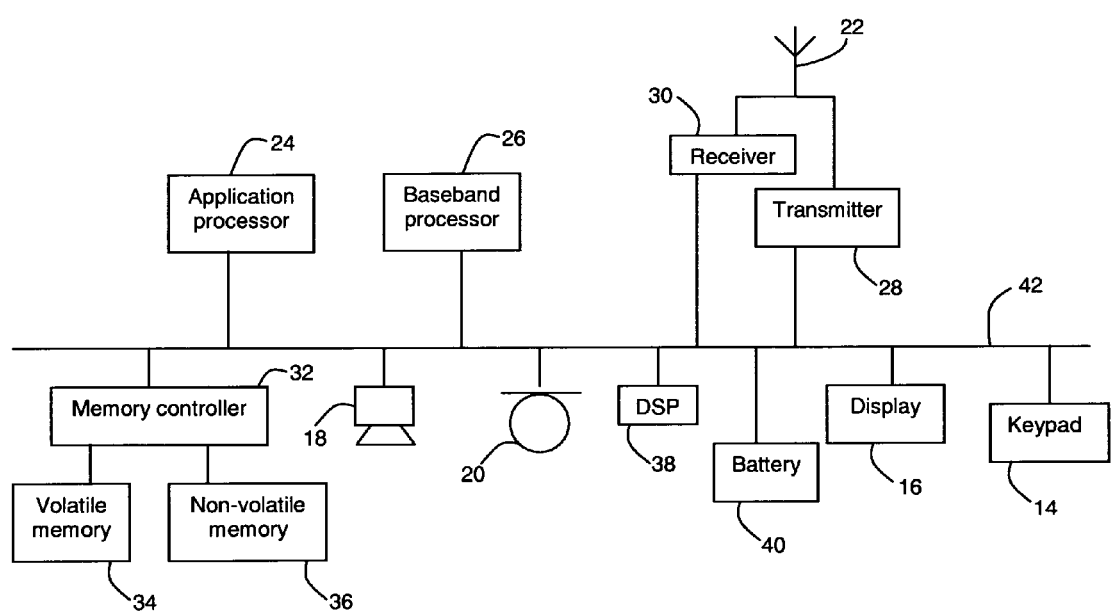
FIG. 2 is a schematic diagram of hardware components of the mobile computing device of FIG. 1.

FIG. 2 is a schematic illustration showing the arrangement of certain of the hardware components of the device 10 of FIG. 1. The keypad 14, display 16, speaker 18 and microphone 20 of this embodiment are connected to a system bus 42. The bus 42 of this embodiment is further connected to an application processor 24, a baseband processor 26, a digital signal processor (DSP) 38, a transmitter 28, a receiver 30 and a battery 40. Transmitter 28 and receiver 30 of this embodiment are connected to antenna 22. The bus 42 of this embodiment is further connected to a memory controller 32 which is, in turn, connected to a volatile memory 34 and a non-volatile memory 36. The application processor 24 of this embodiment processes instructions related to various software modules and operating system software which run on the device 10 and which provide various functionality of the device 10. The baseband processor 26 of this embodiment is concerned with the communication functions and to this end controls a telephony stack and communicates with the transmitter 28 and receiver 30 to establish communications by means of the antenna 22. The various processing elements of the device 10 such as the application processor 24 and baseband processor 26 may, in an alternate embodiment, be provided on a single processor.

Memory controller 32 of this embodiment controls the access to, and interaction with, volatile memory 34 and non-volatile memory 36. The application processor 24 of this embodiment is able to communicate with the various hardware elements as well as the memory controller 32 and thereby control the operation of the various hardware elements according to software instructions stored on volatile memory 34 or non-volatile memory 36.

Only a single bus, bus 42, is illustrated in FIG. 2. It is to be realised that this bus may be replaced by two or more buses in further example embodiments and that the topology of FIG. 2 would vary accordingly. Furthermore, known computing devices include hardware components additional to those illustrated in FIG. 2, but these are known in the art and are not further described or illustrated herein.

Figure 3:
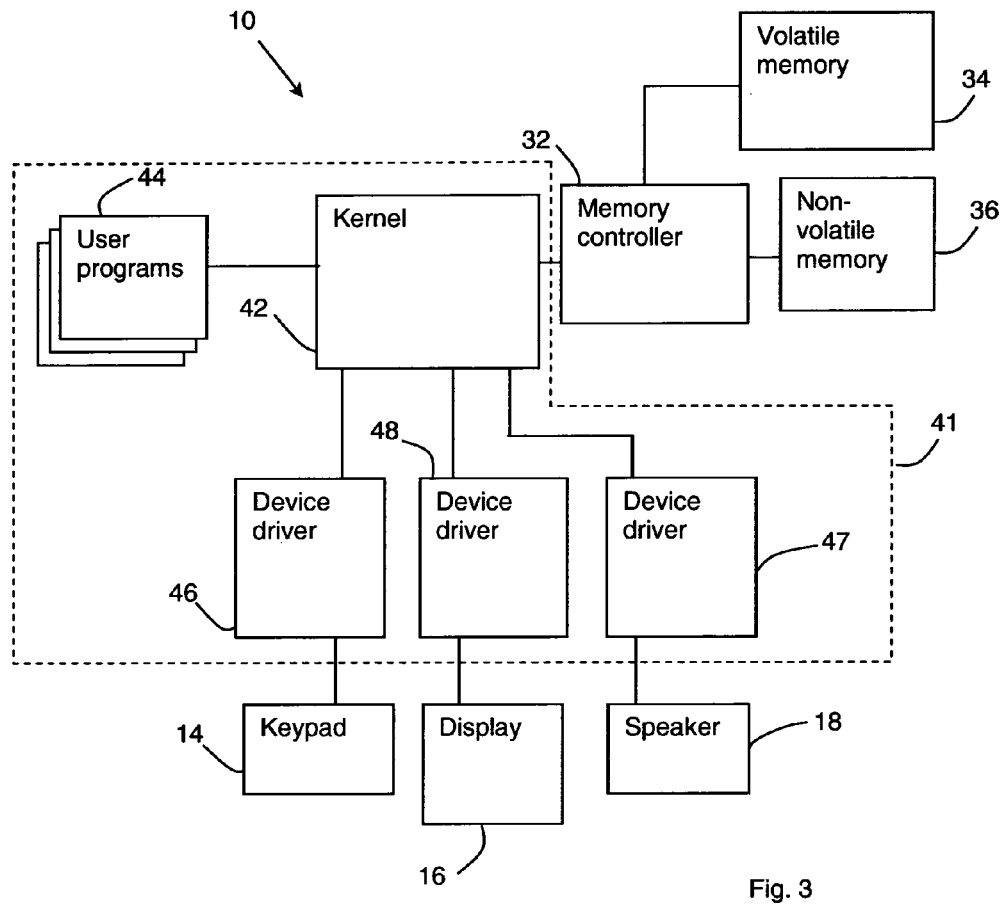
FIG. 3 is a block diagram representing aspects of the mobile computing device of FIG. 1.

FIG. 3 is a diagram illustrating various hardware and software components of the device 10. The software operating on the device 10 of this embodiment can be categorised in various ways. Certain software operates to manage the resources provided by the various hardware components and to establish an operational environment in which other software executes. This software is known as the operating system of the device of this embodiment and is represented in FIG. 3 by a kernel 42. The kernel 42 of this embodiment interacts with the memory controller 32 which, as previously described, is connected to volatile memory 34 and non-volatile memory 36. The kernel 42 of this embodiment is further connected to a plurality of user programs 44 each of which may access the hardware components in a manner dictated by the kernel 42. The kernel 42 of this embodiment is further connected to the keypad 14 by means of device driver 46, to speaker 18 by means of device driver 47 and to the display 16 by means of device driver 48. Only certain of the hardware components of this embodiment have been illustrated but, generally, the kernel 42 controls the hardware resources of the device 10 of this embodiment through various device drivers. Furthermore, although the device drivers of this embodiment have been illustrated as separate to the kernel 42, it is possible for them to be incorporated into the kernel 42 in further example embodiments.

The software components of FIG. 3 are delineated by dashed area 41. However, this distinction between software and hardware is not essential. Components depicted as software in FIG. 3 may be rendered in hardware in further example embodiments, and those depicted as hardware may, in further example embodiments, be rendered as software. Furthermore, some components of further example embodiments may have a software portion as well as a hardware portion.

During operation of the device of this embodiment, software instructions stored in non-volatile memory 36 establish the kernel 42, the user programs 44 and the device drivers 46, 47 and 48. Through the use of the various components illustrated in FIG. 3 a user is able to utilise the device 10 of this embodiment according to the functionality provided by the various user programs 44. For example, a user uses the keypad 14 of this embodiment to communicate with the kernel 42 by means of device driver 46 to cause one of the user programs 44 to access data stored on non-volatile memory 36 by means of memory controller 32. The kernel 42 of this embodiment then causes the data supplied by memory controller 32, together with instructions supplied by the user program, to be sent to the application processor 24 (FIG. 2). The application processor 24 of this embodiment will return results from the data and instructions, generally utilising volatile memory 34 in the process, and these will be returned to the user program by the kernel 42. On further instructions from the user program of this embodiment, the kernel 42 will cause the results to be displayed to the user on display 16 by means of device driver 48.

The illustration of FIGS. 1, 2 and 3 are presented merely by way of example. Known devices on which example embodiments of this invention may operate may comprise more or fewer components than those shown. Implementations of example embodiments of the invention are not dependent on the precise arrangement and configuration of the components shown in FIGS. 1, 2 and 3. Therefore other components with similar functionality may be substituted and further components added thereto or illustrated components omitted therefrom without affecting the operation of certain embodiments of the invention.

Figure 4:
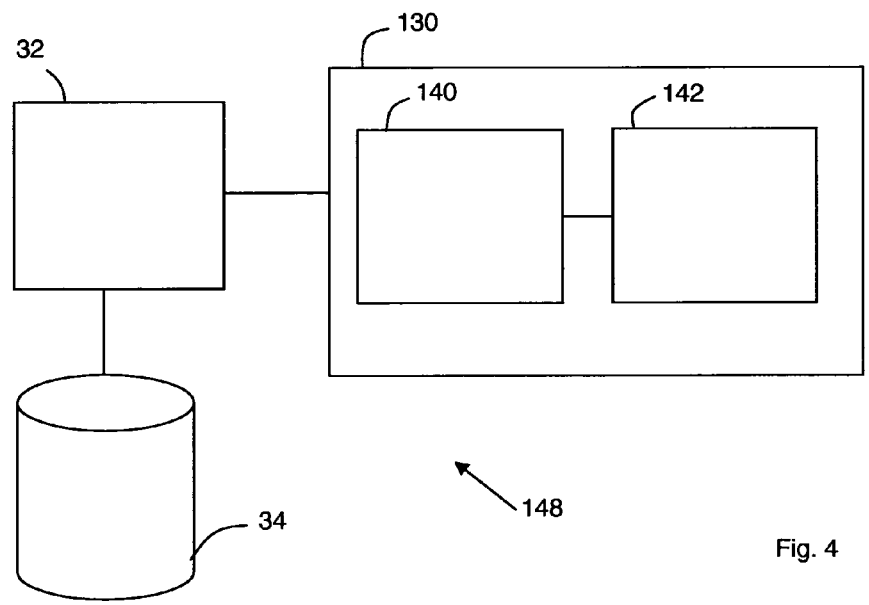
FIG. 4 is a block diagram of a storage system according to an embodiment of the invention.
Figure 5:
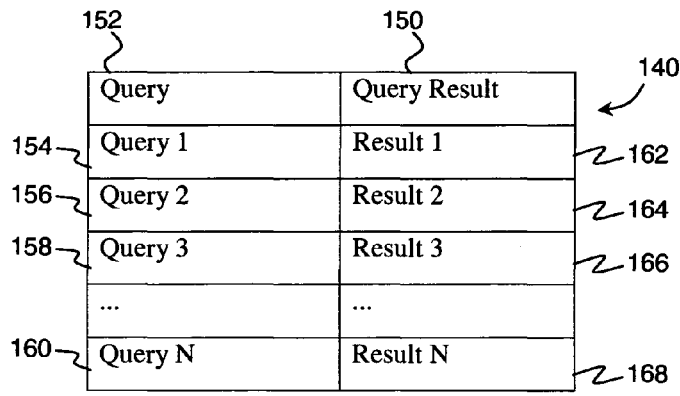
FIG. 5 is a tabular representation of the query store of the storage system of FIG. 4.

FIG. 4 is a block diagram of an example embodiment of the invention and illustrates a storage system 148 of the mobile computing device illustrated in FIGS. 1 to 3. In this example the storage system 148 comprises the memory controller 32 which is connected to the volatile memory 24 and non-volatile memory 36. The non-volatile memory 36 of this embodiment acts as the primary long-term storage for the device of this embodiment. The memory controller 32 of this embodiment is further connected to a cache 130 which includes a query store 140 and a differential store 42. In this embodiment, the cache 130 is implemented in volatile memory 34. In further example embodiments, the cache 130 may be implemented in stand-alone storage, or as part of volatile memory 34. The provision of a faster cache memory for storing the differential and/or query stores may add significant speed advantages. The advantages to partitioning the differential store (see below) are particularly apposite where the differential store is stored in a cache memory as these memories, although being quicker than long term storage, are often significantly smaller. The memory controller 32 of this embodiment controls read and write access to the volatile memory 34, as well as to the query store 140 and the differential store 142. In this embodiment, the non-volatile memory 34 acts as the primary memory store FIG. 5 illustrates the query store 140 of this embodiment in tabular format. In this view, the query store of this embodiment 140 comprises two columns, a query column 152 and a query result column 150. In the query column 152 a number of queries; query 1 154, query 2 156, query 3 158, . . . , query N 160 are stored in this embodiment. In the query result column 150 of this embodiment a number of results are stored: result 1 162, result 2 164, result 3 168, . . . , result N 168. The results stored in the query result column 150 of this embodiment correspond to the queries stored in the query column 152.

The query store 140 of this embodiment is compiled by the memory controller 32 under direction of an appropriate user program such as a mail user program, in this embodiment. When the user program of this embodiment executes a query which relies on data stored on the non-volatile memory 34, a result is calculated and returned to the user program. The memory controller 32 places a copy of the query together with the corresponding result in the query store 40, resulting in the illustrated arrangement for this example.

As the query store 140 is located in the cache 130 in this example embodiment, the data in the query store 140 may be accessed more quickly than the data in the non-volatile memory 36. Furthermore, there is no need to recalculate the results of the query if the query is repeated as the result may be read directly from the query store 140 in this embodiment. However, when the data upon which the results in the query store are based changes, it was previously necessary to invalidate the corresponding entry in the query store 140 and replace this with a recalculated result based on the change data in the non-volatile memory 36.

To avoid this, certain embodiments of the present invention provide for the differential store 142, also stored in the cache 130 of FIG. 4. The differential store 142 of this embodiment comprises a set of pointers pointing to addresses in the non-volatile memory 36 where the data at those addresses has changed since the query store 140 was compiled. The differential store 142 is managed by the memory controller 32 in this example embodiment which determines when data in the non-volatile memory 36 relevant to a stored query changes and stores a pointer to the address of the changed data in the differential store 142. Further aspects of the manner in which the memory controller 32 controls the query store 140 and the differential store 142 in this example embodiment are described below. By storing a pointer to the data of the primary store of this embodiment, the differential store is substantially smaller than it would be if it stored a copy of the data of the primary store. Furthermore, by storing pointers (such as addresses) the corresponding data on the primary store of this embodiment can be easily found and accessed.

Figure 6:
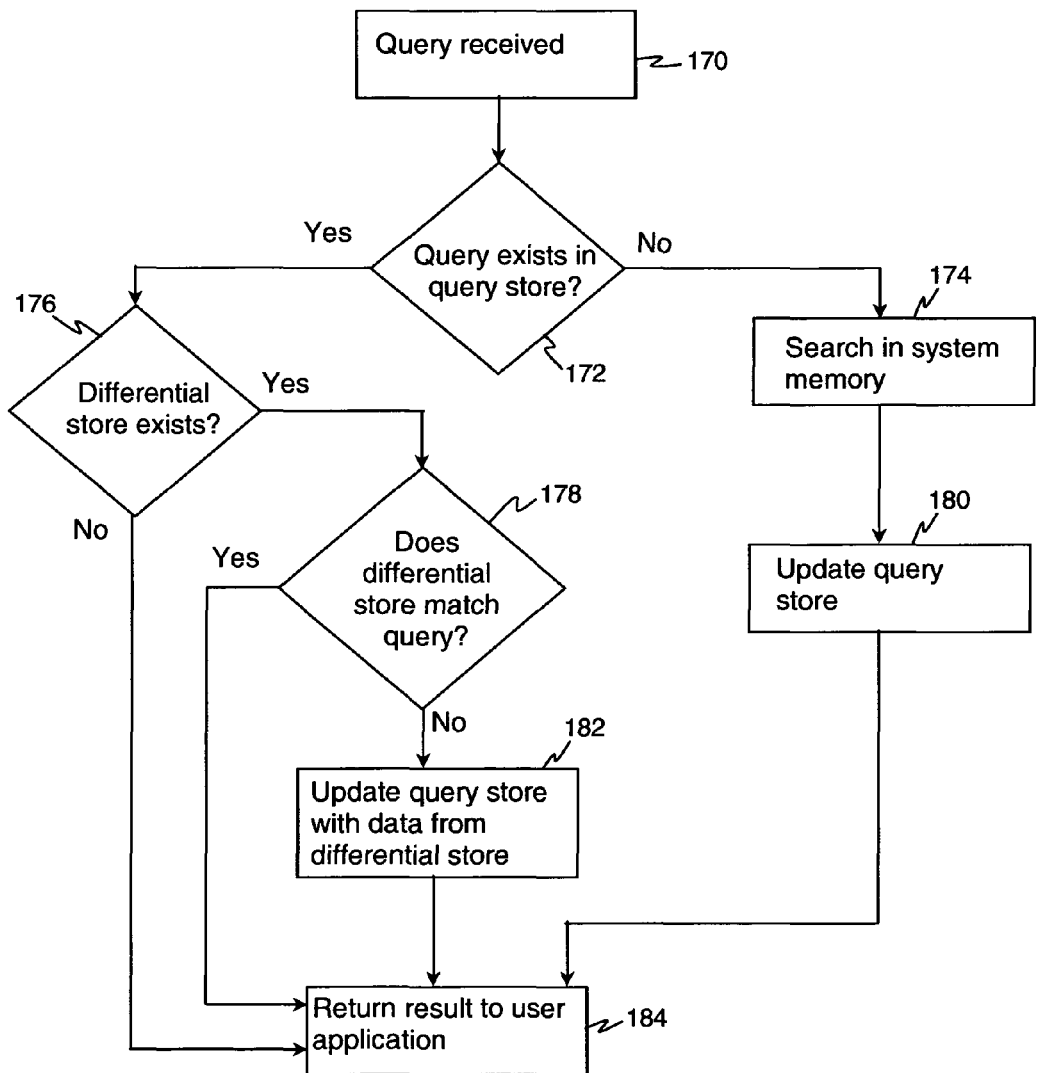
FIG. 6 is a process diagram illustrating an embodiment of the invention.

FIG. 6 is a process diagram of an example embodiment of the invention and illustrates how a new received query is serviced with the arrangement illustrated in FIGS. 4 and 5. At block 170 of this embodiment the query is received. In the aforementioned example embodiment, this would be received from a user application (although the origin of the query is not important for the purposes of the present invention and further embodiments apply in respect of queries generated by, for example, the memory controller 32). At the following block of this embodiment, block 172, the memory controller 32 determines whether the query exists in the query store 140. In this embodiment, this is done by searching the queries stored under the query column 152 for an entry therein corresponding to the received query.

If a query corresponding to the received query exists in the query store 140 the process of this embodiment continues to block 176 where the memory controller determines whether a differential store exists. If the differential store does not exist the process of this embodiment proceeds to block 184 where the result of the query is returned to the client. This is done by satisfying the query from data stored in the non-volatile memory 36 of this embodiment in a conventional manner. If however the differential store does exist the process of this embodiment proceeds from block 176 to block 178 in this embodiment where the memory controller 32 of this embodiment 34 determines whether the data in the non-volatile memory 36 referenced by the entries in the differential store satisfy the received query.

If data referenced by the differential store matches the received query, the process of this embodiment continues to block 182 where the query store is updated. The updating of the query store 140 occurs, in this example embodiment, by the memory controller 32 replacing or updating the result data stored in column 150 for the row corresponding to the received query with the changed data in the non-volatile memory 36 referenced by the differential store 142. Once this update to the query store has occurred, the process will continue to block 184 in this example embodiment where the results for the received query are returned to the user application which initiated the received query. As the query cache has been updated, the memory controller 32 of this embodiment will read the required result directly from the query cache 140 in this instance.

If no data referenced by the differential store matches the received query, the process of this example embodiment will proceed from block 178 to block 184 and will satisfy the received query from the query store. In this instance, it will have been determined that no updates to the primary store influence the result of the received query.

Returning to block 172, if there is no query in the query cache 140 corresponding to the received query, the process of this example embodiment will proceed to block 174 where the result of this query is calculated from data stored in non-volatile memory 36. Once this has been done, in block 180, the query cache of this embodiment will be updated with a new entry corresponding to the received query and the calculated result. Then, in block 184 of this embodiment, the result is reported to the user application of this example embodiment.

Example embodiments of the invention may be implemented with different types of data and different corresponding queries and results. Due to the fact that the differential store 142 of the above embodiment contains pointers to data in the non-volatile memory 36 which has changed since the query store 140 was compiled, the received query can be satisfied with significantly fewer instructions where the data relating to that query in the non-volatile memory 36 has changed. In a previously known arrangement it would be necessary, where the data in the non-volatile memory 36 has changed, to recalculate the entire query or to search for the data on non-volatile memory 36 which has changed. However, under the arrangement of example embodiments of the invention, the memory controller 32 can quickly identify those queries which need to be recalculated and find the pertinent data on the non-volatile memory 36 pertaining to that query. Embodiments of the invention therefore provide a storage system for queries and corresponding results where, when the data on which the results are based changes is able to update the query by accessing those portions of the primary store which have changed. As only the changes to the primary store need be accessed to update the result, the computation and memory accesses of this embodiment are significantly reduced when compared to a system that either has to recalculate the entire query or has to search the entire primary store to determine if data has changed. Therefore example embodiments of the invention are able to satisfy cached queries based on changed data with fewer computations and memory access cycles than was previously the case.

Figures 7, 8, 9:
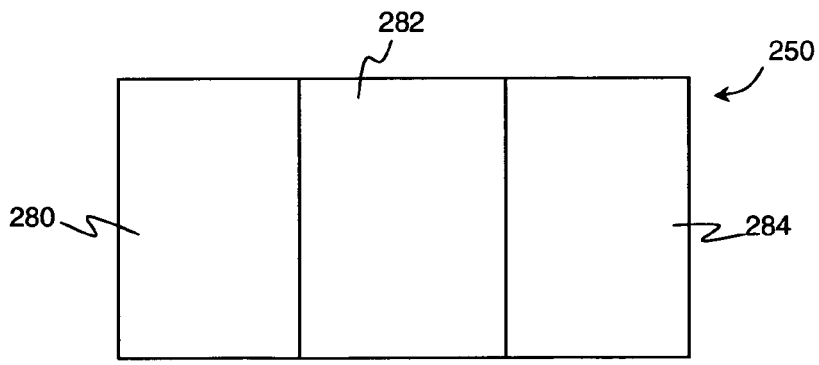
FIG. 7 is a tabular representation of a query store according to a further embodiment.
FIG. 8 is a tabular representation of a differential store according to a further embodiment.
FIG. 9 is a block diagram of a query store according to a further embodiment.

FIGS. 7, 8 and 9 illustrate aspects of a further example embodiment of the invention which applies to messaging information. The example arrangement illustrated in FIG. 4 may apply to this embodiment too. In this embodiment, a messaging store is considered in place of non-volatile memory 36. However, the messaging store would be contained within a larger memory store and the difference in this respect is immaterial to the operation of example embodiments of invention.

As illustrated in FIG. 7, the query store 200 according to this embodiment of the invention may comprise three columns: a query column 202, a query result column 204 and a service type column 106. Stored in the query column 102 of this embodiment are five queries: query 1 208, query 2 210, query 3 212, query 4 114 and query 5 216. In query result column 204 of this embodiment the following results: result 1 218, result 2 220, result 3 222, result 4 224 and result 5 226 are stored. The queries and results stored in this example embodiment are functionally similar to the query store 140 described above with reference to FIG. 5. The query store 200 of the example embodiment of FIG. 7 differs in that it includes a service type column where an indication of the service of the query is stored. In this embodiment, there are three services: service A, service B and service C. Query 1 is of type service A as reflected in entry 228, query 2 of service type B as reflected in entry 230, query 3 is of service type A as reflected in entry 232, query 4 is of service type B as reflected in entry 234 and query 5 is of service type C as indicated in entry 236. In this embodiment, the services correspond to types of messaging. Therefore, for example, service type A could correspond to SMS messages, service type B to email messages, and service type C to MMS messages. It is to be realised that the invention is not limited in this respect and the service type column may be used to store other information such as any label according to which the queries can be grouped (which will depend on the type of data to which those queries relate). The label may take a plurality of values. A label for the data allows the storage system to quickly find the data by categorising the contents of the differential store according to said values of said label. More than one label may be used.

As the data of this embodiment relates to messaging, the queries and corresponding results of the query store 200 will relate to messaging. For example, query 1 may be a request to display all email messages (i.e. service type B in this example) sent by a specified sender. The corresponding result, result 1, would then contain a list of all email messages which have been sent by that sender. It is to be understood however that the invention is not dependent on the type of queries or on the type of data concerned.

FIG. 8 illustrates the differential store 250 for this embodiment of the invention. The differential store 250 of this embodiment comprises a data column 252 and a service type column 254. The data column 252 stores pointers to the messaging store. The differential store 250 comprises five entries: pointer 1 256, pointer 2 258, pointer 3 260, pointer 4 262 and pointer 5 266. Each pointer of this embodiment comprises an address for data on the primary store which has changed. The differential store 250 of this embodiment differs from the differential store 142 illustrated in FIG. 4 in that it includes an additional column comprising the service type, column 254, which stores an indication of the service type corresponding to the data in the messaging store pointed to by the pointer stored under the data column 252. Therefore, as illustrated in FIG. 8, pointer 1 is of type service A 268, pointer 2 is of type service B 270, pointer 3 is of type service C 272, pointer 4 is of type service B 274 and pointer 5 is of type service B 278.

In an alternative embodiment, the differential store and the query store both store a time stamp for each entry so that it can be determined, by comparing a time stamp of the entry of the query store with the time stamp of a query of the differential store whether that entry in the differential store is relevant to a particular query of the query store. This avoids the need to reference changes to data of the primary store which occurred before the received query in the query store was calculated.

The embodiment of FIGS. 7 and 8 will operate in the same manner as described above with reference to FIG. 6. However when the query is received in block 170 in this example embodiment, the memory controller 32 will receive a service type for that query from the client application (which in this case may be a messaging application). Therefore in blocks 172 and 178 of this embodiment when the memory controller 32 queries the query store 200 and the differential store 250 it will only query those entries corresponding to the service of the received query. This helps to reduce the number of entries to be queried therefore potentially improving the speed of the entire process.

Furthermore, in this example embodiment, when the differential store and the query store (corresponding to block 180) are updated, the data in these stores includes an indication of the corresponding service to ensure future consistency. Generally, the label may relate to a service type for the data.

FIG. 9 is an alternate representation of the differential store 250 of FIG. 8. As illustrated in FIG. 9, the differential store 250 of this embodiment is partitioned into three partitions 280, 282 and 284. The three partitions correspond to the three service types stored in the differential store 250. Partition 280 corresponds to service type A, partition 282 corresponds to service type B and partition 284 corresponds to service type C. In the example embodiment illustrated, the partitions 280, 282 and 284 are of equal size and all of the row entries (in the representation of FIG. 8) corresponding to service A are stored in partition 280, those entries corresponding to service B are stored in partition 282 and those corresponding to service C are stored in partition 284. By partitioning the differential store according to the values of the label, the time taken, and computations involved in, finding data in the differential store of this embodiment is improved. A predetermined size for the partitioning has the advantage of being relatively simple to implement and maintain.

Each of the partitions 180, 182 and 184 of this embodiment corresponds to a block of addresses of the differential store 150. Therefore, when the memory controller 32 of this embodiment queries the differential store, it is merely necessary to search the corresponding partition for the service type of the received query. It is therefore unnecessary in this example embodiment for the memory controller 32 to query each of the entries in the query store 250 when accessing this store. This too improves the speed with which the memory controller can access data in the differential store 150.

Although the arrangement illustrated in FIG. 8 shows three partitions of equal size, other partitions and portion sizing are possible. More or fewer than three partitions may be implemented depending on the appropriate service types (or any other label used to delineate the entries in the query store). Furthermore, it is not necessary for the partitions to have equal size. Instead, if it is known that certain services may require more space than others, the partitions may be arranged accordingly.

In an example embodiment the partitioning may be dynamically arranged to suit changing requirements. This helps to avoid wastage of storage which, in the case where the differential store 150 is stored in a small but quick memory, frees up valuable resources. By varying the size of the partitions dynamically, changing storage requirements for data relating to different values of the label can be accommodated and more efficient use may be made of the space available for storing the differential store.

By dynamically varying the number of partitions, embodiments of the invention are able to accommodate data in the differential store with a varying number of values for the label. This too provides for efficient use of the space available for storing the differential store.

It is to be realised however that partitioning of the differential cache 150 is not necessary and that the aforementioned arrangement of the query and differential stores illustrated in FIGS. 7 and 8 leads to a reduction in the number of executed cycles for the average query in stores of embodiments where no partitioning is used.

From the aforementioned operation of the embodiment of FIG. 6 and the corresponding discussion relating to the embodiments of FIGS. 7, 8 and 9, it will be realised that, over time, the differential store of certain embodiments may become larger and larger. Generally, the size of the differential store is limited by the storage medium on which it resides, specifically so in the case where the storage medium is a small but fast storage type utilised as RAM. In a further embodiment, a process by which the differential store is flushed or deleted is provided. Prior to flushing, it is desirable to incorporate the changes to the system memory represented by the differential store into the query store before deleting the entries in the differential store. This can be a processor intensive procedure and scheduling the flushing of the differential store for a particular time is therefore advantageous.

Figure 10:
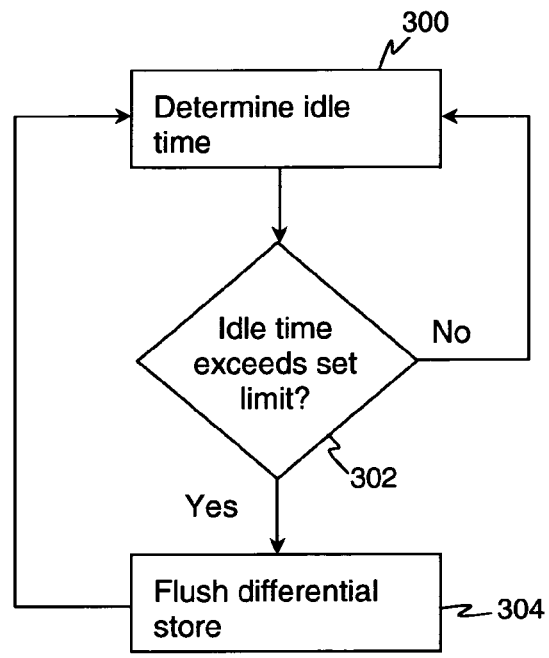
FIG. 10 is a process diagram of a further embodiment of the invention.

FIG. 10 illustrates a process for flushing a differential cache according to an example embodiment. At block 300 the memory controller 32 determines a time period in which the differential store is idle (the time period in which the differential store is not accessed). At block 202, the memory controller 32 of this embodiment compares the calculated idle time for the differential store against a predetermined limit. If the idle time exceeds the limit, the process of this embodiment continues to block 304 where the differential cache is flushed. Performing this update after a predetermined time will increase the chances that the updating process, which can be processor intensive, does not interfere with the normal operation of the differential store.

However, if the idle time does not exceed the predetermined limit, the process of this embodiment returns to block 300 in this embodiment.

Figure 11:
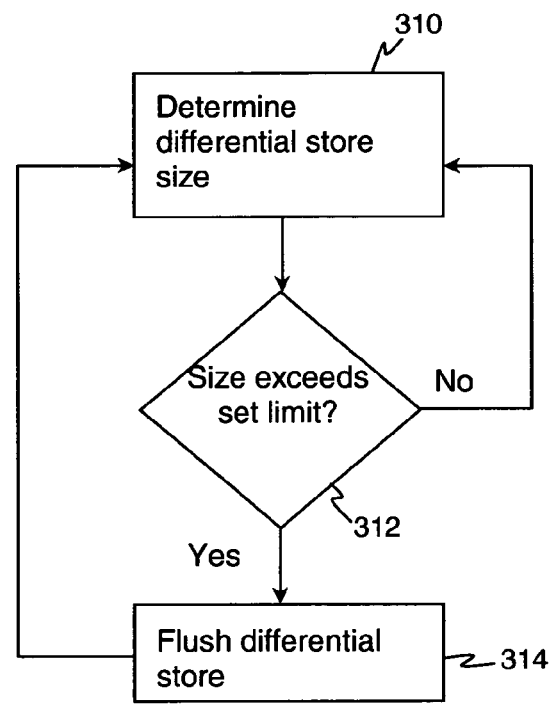
FIG. 11 is a process diagram of a further embodiment of the invention.

FIG. 11 illustrates an alternate process for flushing the differential cache. At block 310 the memory controller 32 of this embodiment determines a size of the differential cache. At block 312 of this embodiment the memory controller 32 compares the determined size against a predetermined limit. If the size exceeds the set limit, the process continues to block 314 where the differential cache of this embodiment is flushed. Flushing the differential cache (or updating a content of the query store) when the differential store exceeds a predetermined size helps ensure that the differential store does not reach a size which would unacceptably affect the time it takes to search the differential store and ensure that the data in the differential store is not corrupted, which may occur if the store exceeded a maximum size. For example the updating process may be performed when the differential store is 75% full. However, if the size of the differential cache does not exceed the set limit, the process returns to block 301.

It is to be realised that the processes of FIGS. 10 and 11 are not mutually exclusive and may be used in conjunction with one another. In either case, flushing of the differential cache of such embodiments may involve updating the queries in the query store for which entries in the differential cash indicate that changes to the non-volatile memory 36 would have an impact.

In certain embodiments, content of the query store may be updated with reference to data stored in the differential store. For example, the query store may be adapted by recalculating the queries of the query store which the differential store indicates have changed. Thereby embodiments of the invention ensure that the query store is only updated when the calculated result corresponding to a query is needed by the system. This is more efficient and quicker than updating the result each time the data on which that result is based changes.

In an alternative embodiment, the contents of the query store and the differential store are flushed simultaneously. This is useful if the processor is too busy to update the query store with the contents of the differential store.

It will be understood by the skilled person that alternative implementations are possible, and that various modifications of the methods and implementations described herein may be made within the scope of the invention, as defined by the appended claims. It should also be noted that any combination of the features and process elements described herein may be combined or omitted in different embodiments of the invention.

The invention claimed is:

1. A method comprising:
   storing, in a query store, a query and a result relating to said query derived from a primary store; and
   storing an indication that data of said primary store has changed in a differential store, wherein the differential store is configured to store changes to contents of the primary store.

2. The method according to claim 1 further comprising storing data relating to said stored query and to the stored result in the differential store.

3. The method according to claim 1 further comprising servicing the received query by retrieving data from the query store and from the differential store.

4. The method according to claim 1 wherein the differential store is adapted to store data together with a label corresponding to the data.

5. The method according to claim 4 wherein the label identifies a data type, the method further comprising storing more than one data type in the differential store wherein the differential store is partitioned, each partition accommodating data having a different value for the label.

6. The method according to claim 1 further comprising updating contents of the query store with reference to data stored in the differential store.

7. An apparatus comprising:
   a processor,
   memory arranged into a primary store, a query store and a differential store;
   the memory including computer program code,
   the memory and the computer program code configured to, with the processor, cause the apparatus at least to perform:
      store, in the query store, a query and a result relating to the query derived from the primary store; and
      store an indication that data of the primary store has changed in the differential store, wherein the differential store is configured to store changes to contents of the primary store.

8. The apparatus according to claim 7 wherein the apparatus is further caused to perform: store data relating to the stored query and to the stored result in the differential store.

9. The apparatus according to claim 7, wherein the apparatus is further caused to perform: store a pointer to the primary store in the differential store.

10. The apparatus according to claim 9 wherein the apparatus is further caused to perform: service the received query by retrieving data from the query store and from the differential store.

11. The apparatus according to claim 7 wherein the apparatus is further caused to perform: store the differential store which is adapted to store data together with a label corresponding to the data.

12. The apparatus according to claim 11 wherein the label identifies a data type, and wherein the apparatus is further caused to perform: store more than one data type in the differential store wherein the differential store is partitioned, each partition accommodating data having a different value for the label.

13. The apparatus according to claim 12 wherein one or more of the partitions has a predetermined size.

14. The apparatus according to claim 13 wherein a size of one or more of the partitions is dynamically variable.

15. The apparatus according to claim 12 wherein the number of partitions is dynamically variable.

16. The apparatus according to claim 7 wherein the primary store is stored on a first storage type and the query store and the differential store are stored on a second storage type, the second storage type having a faster access time than the first storage type.

17. The apparatus according to claim 7 wherein the apparatus is further caused to perform: update contents of the query store with reference to data stored in the differential store.

18. The apparatus according to claim 17 wherein the updating is performed if a size of the differential store exceeds a predetermined size.

19. The apparatus according to claim 17 wherein the updating is performed after a predetermined time.

20. The apparatus according to claim 19 wherein the predetermined time is determined with reference to a time period during which the differential store is idle.

21. A computer program product comprising a computer readable medium bearing computer program code embodied therein for use with a computer, the computer program code comprising:
   code for storing, in a query store, a query and a result relating to the query derived from a primary store; and
   code for storing an indication that data of the primary store has changed in a differential store, wherein the differential store is configured to store changes to contents of the primary store.

* * * * *

UNITED STATES PATENT AND TRADEMARK OFFICE
CERTIFICATE OF CORRECTION

| | | |
|---|---|---|
| PATENT NO. | : 8,856,449 B2 | Page 1 of 1 |
| APPLICATION NO. | : 13/131832 | |
| DATED | : October 7, 2014 | |
| INVENTOR(S) | : Mudigowdra et al. | |

It is certified that error appears in the above-identified patent and that said Letters Patent is hereby corrected as shown below:

<u>Title page,</u>
Item (75), "Kavila Khatawate" should read --Kavita Khatawate--.

Signed and Sealed this
Ninth Day of June, 2015

Michelle K. Lee
*Director of the United States Patent and Trademark Office*